US011630986B2

(12) United States Patent
Norman

(10) Patent No.: US 11,630,986 B2
(45) Date of Patent: *Apr. 18, 2023

(54) GRAPH CONVERSION METHOD

(71) Applicant: Graphcore Limited, Bristol (GB)

(72) Inventor: David Norman, Bristol (GB)

(73) Assignee: GRAPHCORE LIMITED, Bristol (GB)

(*) Notice: Subject to any disclaimer, the term of this patent is extended or adjusted under 35 U.S.C. 154(b) by 386 days.

This patent is subject to a terminal disclaimer.

(21) Appl. No.: 16/838,075

(22) Filed: Apr. 2, 2020

(65) Prior Publication Data

US 2020/0320368 A1 Oct. 8, 2020

Related U.S. Application Data

(63) Continuation of application No. 16/527,509, filed on Jul. 31, 2019.

(30) Foreign Application Priority Data

Apr. 2, 2019 (GB) ..................................... 1904625

(51) Int. Cl.
*G06N 3/04* (2006.01)
*G06N 20/00* (2019.01)
(Continued)

(52) U.S. Cl.
CPC ................. *G06N 3/04* (2013.01); *G06F 9/54* (2013.01); *G06F 16/9024* (2019.01);
(Continued)

(58) Field of Classification Search
CPC .. G06N 3/04; G06N 3/08; G06N 3/10; G06N 3/084; G06N 3/105; G06N 3/0454;
(Continued)

(56) References Cited

U.S. PATENT DOCUMENTS 7,089,526 B1 * 8/2006 Salowe ................ G06F 30/394
716/129
10,635,739 B1 * 4/2020 Batruni ................ G06N 20/00
(Continued)

OTHER PUBLICATIONS

Peemen, M. "Inter-Tile Reuse Optimization Applied to Bandwidth Constrained Embedded Accelerators". Jan. 1, 2015, France. 7 pages.
(Continued)

*Primary Examiner* — James N Fiorillo
(74) *Attorney, Agent, or Firm* — Haynes and Boone, LLP

(57) ABSTRACT

A method for generating an executable program to run on a system of one or more processor chips each comprising a plurality of tiles. The method comprises: receiving a graph comprising a plurality of data nodes, compute vertices and directional edges, wherein the graph is received in a first graph format that does not specify which data nodes and vertices are allocated to which of the tiles; and generating an application programming interface, API, for converting the graph, to determine a tile-mapping allocating the data nodes and vertices amongst the tiles. The generating of the API comprises searching the graph to identify compute vertices which match any of a predetermined set of one or more compute vertex types. The API is then called to convert the graph to a second graph format that includes the tile-mapping, including the allocation by the assigned memory allocation functions.

11 Claims, 5 Drawing Sheets

(51) Int. Cl.
*G06F 16/901* (2019.01)
*G06F 9/54* (2006.01)
*G06F 17/15* (2006.01)
*G06F 17/16* (2006.01)

(52) U.S. Cl.
CPC .............. *G06F 17/15* (2013.01); *G06F 17/16* (2013.01); *G06N 20/00* (2019.01)

(58) Field of Classification Search
CPC .. G06N 20/00; G06F 9/50; G06F 9/54; G06F 9/505; G06F 9/5063; G06F 9/5069; G06F 9/5083; G06F 8/41; G06F 8/451; G06F 16/901; G06F 16/9024; G06F 16/9027; G06F 17/15; G06F 7/16; G06F 7/78; G06F 7/5443; H03H 17/00
USPC .......................................................... 706/15
See application file for complete search history.

(56) References Cited

U.S. PATENT DOCUMENTS

| | | | | |
|---|---|---|---|---|
| 2013/0117521 | A1* | 5/2013 | Li | G06F 12/1045 711/170 |
| 2017/0358055 | A1* | 12/2017 | Swift | G06T 1/60 |
| 2019/0050728 | A1* | 2/2019 | Sim | G06N 3/04 |
| 2019/0147319 | A1* | 5/2019 | Kim | G06N 3/0454 706/15 |
| 2019/0205480 | A1* | 7/2019 | Zhang | G06F 16/9024 |
| 2019/0303743 | A1* | 10/2019 | Venkataramani | G06F 9/30145 |
| 2019/0392297 | A1* | 12/2019 | Lau | G06F 17/16 |
| 2020/0125960 | A1* | 4/2020 | Javaheripi | G06N 3/10 |
| 2020/0175042 | A1* | 6/2020 | Batruni | G06F 17/10 |
| 2020/0218523 | A1* | 7/2020 | Pupilli | G06N 3/08 |
| 2021/0174367 | A1* | 6/2021 | Harris | H04L 41/12 |
| 2022/0107914 | A1* | 4/2022 | Koker | G06F 16/24569 |

OTHER PUBLICATIONS

Hussain, Tassadaq, et al., "PAMS: Pattern Aware Memory System for Embedded Systems". Barcelona, Spain. 2014. 7 pages.

Tagliavini, G, et al. Optimizing Memory Bandwidth Exploitation for Open VX Applications on Embedded Many-Core Accelerators. Nov. 2015 online, https://doi.org/10.1007/s11554-015-0544-0.

Examination Report dated Mar. 4, 2021 for Patent Application No. GB1904625.9. 5 pages.

Examination Report dated Dec. 17, 2021 for United Kingdom Patent Application No. GB1904625.9.

* cited by examiner

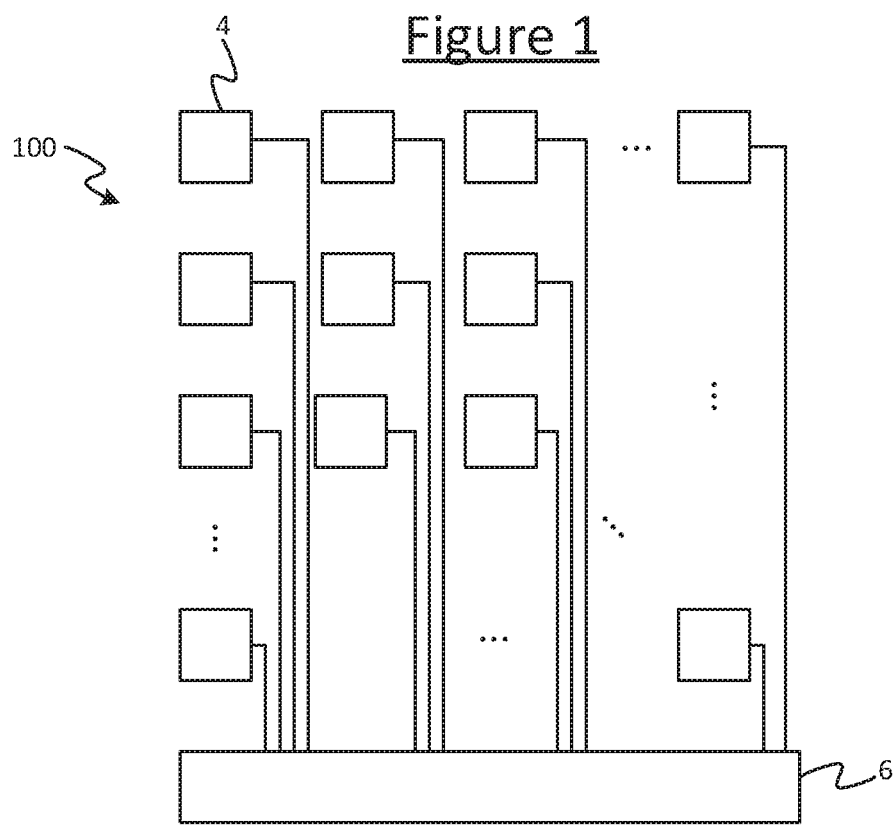
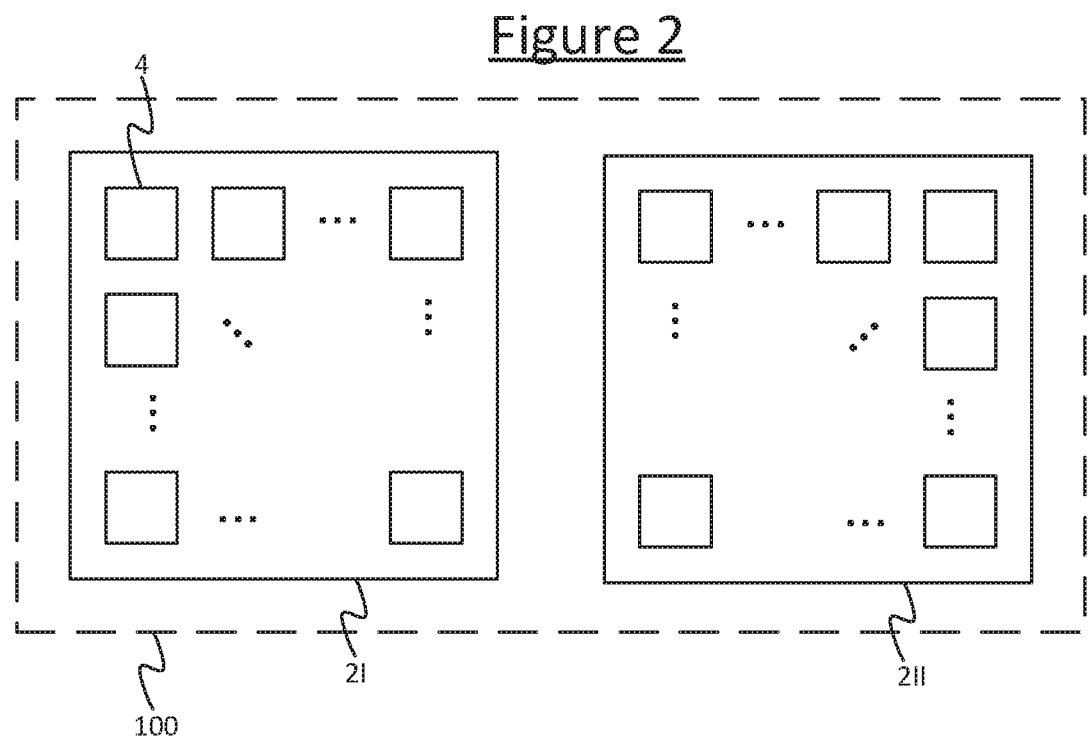

GRAPH CONVERSION METHOD

CROSS-REFERENCE TO RELATED APPLICATIONS

This application is a continuation of U.S. patent application Ser. No. 16/527,509 filed Jul. 31, 2019, which claims priority to United Kingdom Patent Application No. 1904625.9 filed Apr. 2, 2019, the entire contents of which are incorporated herein by reference.

TECHNICAL FIELD

The present disclosure relates to compiling a graph-based program to run on a processing system comprising a plurality of parallel processor modules (tiles).

BACKGROUND

Nowadays computer systems are increasingly employing parallel computing techniques. This refers to the case where multiple separate processing units are provided in parallel. For instance, parallelism can be implemented by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables the pieces of code run on the different tiles to communicate with one another between tiles. In some cases, multiple different processors on different chips may be connected together via an external interconnect with each processor comprising multiple tiles. Hence it is possible to connect together multiple independent processing resources with a high degree of parallelism.

An example application of parallel processing is found in machine intelligence. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs, or to make inferences as to inputs (causes) given a specified set of outputs.

The implementation of each node will involve the processing of data, and the interconnections of the graph correspond to data to be exchanged between the nodes. Typically, at least some of the processing of each node can be carried out independently of some or all others of the nodes in the graph, and therefore large graphs expose great opportunities for parallelism.

However, as computer systems grow beyond simple single-processor, single-core devices, it becomes necessary to determine how the program is to be split between the different parallel resources. Conventionally this is either specified manually by the programmer, or alternatively certain tools exist which attempt to divide the compute processing burden evenly across the parallel processing resources.

SUMMARY

An issue with existing tools is that they only attempt to balance the processing and memory burden evenly across the different parallel processing resources. They do not consider the meaning of the data. It would be desirable to provide a mechanism that enables allocating the data across the tiles in a more intelligent fashion, to allow for taking into account the way that the downstream computations in the graph will use that data. E.g. it would be desirable to take into account the dimensionality of the data, and how the downstream computation will process the different dimensions of the data. For instance consider a convolution of a kernel of weights with a 4D volume of input data representing a batch of images, e.g. one dimension representing width W, one dimensions representing height H, one channel C (such as red, green & blue or YUV), and one representing the number N in the batch of images (see FIG. 9 by way of example, to be discussed in more detail later). Say also, for the sake of example, that the convolution scans the dimensions in the order WHCN (width first, then height, then channel, then number). It this case would be desirable, for instance, to store slices of W×Hon the same tile, since the convolution will most frequently access different values of W & H for the same value of C & N. I.e. it would be desirable to place the most frequent access close to one another, preferably on the same tile. It will be appreciated that this is just one example, and other types of computations such as matrix multiplications or dynamic slice operations will also have their own characteristic way of processing their inputs, such as the way they process the different dimensions of the data (e.g. the scheme by which they scan through the different dimensions of the data).

According to one aspect disclosed herein, there is provided a computer-implemented method for generating an executable program to run on a system of one or more processor chips each comprising a plurality of tiles, each tile comprising its own processing unit and memory. The method comprises: receiving a graph comprising a plurality of data nodes, a plurality of compute vertices and a plurality of directional edges, each data node representing input data, each edge representing an input to a compute vertex from a data node or an output from a compute vertex input to another compute vertex, and each compute vertex representing one or more computations to perform on the input to the compute vertex in order to produce the output from that compute vertex, wherein the graph is received in a first graph format that does not specify which data nodes and vertices are allocated to which of the tiles. The method further comprises generating an application programming interface, API, for converting the graph from the first format including to determine a tile-mapping allocating the data nodes and vertices amongst the tiles, wherein the generating of the API comprises searching the graph to identify compute vertices which match any of a predetermined set of one or more compute vertex types. For each such identified compute vertex, the generating of the API further comprises: tracing one or more paths through the graph from the identified compute vertex in order to identify the data node or nodes being a respective source of input data for that compute vertex, wherein each compute vertex type is associated with one or more corresponding type of memory allocation function for determining how to allocate storage of input data amongst the tiles in a manner adapted to that compute vertex type; and, to each of one or more of the respective source nodes, assigning, as part of the API, one of the types of memory allocation function corresponding to the type of the identified compute vertex, for allocating the input data of the one or more source nodes accordingly. The API is then called in order to convert the graph to a second graph format that includes the tile-mapping, including the allocation by the assigned memory allocation functions. The graph can then be compiled from the second format to generate said executable program, with the vertices and data nodes implemented on the tiles specified by the tile-mapping.

In embodiments, the set may be of a plurality of predetermined compute vertex types, each associated with one or more respective corresponding types of memory allocation function for determining how to allocate storage of input data amongst the tiles in a manner adapted to the particular compute vertex type.

In embodiments, at least some of the data nodes may each represent input data comprising one or more tensors, each tensor having at least two dimensions. In embodiments, one or more of the tensors may have at least three dimensions each. In embodiments, one or more of the matrices have more than three dimensions each.

In embodiments, for at least one of the identified compute vertices, at least one of the traced paths may comprise at least one intermediate predecessor compute vertex between the identified compute vertex and the respective source data node or nodes.

In embodiments, the generating of the API may comprise: for each of the identified compute vertices, determining whether any of the predecessor compute vertices in any of the traced paths is a shape-changing vertex that changes a number of elements in any dimension of any tensor between the input data of the respective source node or nodes and the identified compute vertex. Said assigning of memory allocation functions may comprises: for at least one of the identified compute vertices, assigning one of the corresponding types of memory allocation function to the respective source data node or nodes, based on having determined that the identified compute vertex has no predecessor compute vertices that are shape-changing vertices; but for at least one other of the identified compute vertices, not assigning the corresponding type of memory allocation function to its source data nodes, based on having determined that the identified compute vertex has at least one predecessor compute vertex that is shape-changing, and instead assigning a generic memory allocation function to the respective source data node or nodes.

That is to say, for a given compute vertex, the method checks whether the input data is changed in shape between the source node(s) and the compute vertex in question. Changing shape here could mean changed in size (such as in the case of a concatenation of two tensors), or a rotation of a non-even-sided matrix or higher-level tensor (e.g. by a dim shuffle operation). Because the shape or dimensionality of the tensor data is distorted, this means the algorithm cannot necessarily allocate the data amongst the tiles in a way that is intelligently tailored to the compute vertex in question, and so falls back on a generic memory allocation function.

In embodiments, the generic memory allocation function may spread the input data of the source node or nodes across a group of some or all of the tiles without taking into account the how the identified type of compute vertex processes different dimensions of its input or inputs.

In embodiments, the generic memory allocation function may attempt to spread the input data evenly across said group of tiles in terms of quantity of data.

In some embodiments, the method can in fact look pat shape-shaping predecessor vertices. In this case, the generating of the API may comprise: for at least one of the identified compute vertices, determining that at least one of the predecessor compute vertices in at least one of the traced paths is a shape-changing vertex that changes a number of elements in at least one dimension of at least one tensor between the input data of the respective source node or nodes and the identified computer vertex; looking up that the type of said at least one compute vertex is found in a predetermined list of shape-changing vertices for which a reverse shape changing operation is available; allocating one of the corresponding types of memory allocation function to the respective source data node or nodes; and applying the reverse shape changing operation to the at least one tensor.

In one example, the computation represented by at least one of the compute vertices may comprise a convolution configured to convolve a kernel of weights with a multidimensional portion of target data, the weights and target data each being comprised by the input data of one or more of the data nodes, or derived therefrom via one or more intermediate compute vertices between the input data and the convolution vertex. In this case, one of the compute vertex types may comprise a convolution vertex type which matches to the convolution in said search.

E.g. the convolution may scan the kernel though the target data according to a hierarchical order of dimensions from major to minor, and one of the corresponding memory allocation functions is configured to perform its allocation by dividing the input data that is the target data, or from which the target data is derived, based on the hierarchical order, grouping together slices of data cut parallel to one or more minor dimensions.

In embodiments, the convolution vertex type may have another corresponding type of memory allocation to add the weights.

In another alternative or additional example, at least one of the compute vertices may represent a computation comprising a matrix multiplication which multiplies a left-hand side with a right-hand side, each being a tensor and at least one of which is a matrix, the matrix multiplication left-hand side and right-hand side each being comprised by the input data of one or more of the data nodes, or derived therefrom via one or more intermediate compute vertices between the input data and the convolution vertex. In this case, one of the compute vertex types may comprise a matrix multiplication vertex type which matches to the matrix multiplication in said search, and which has at least one corresponding memory allocation function for allocating the matrix multiplication left-hand side values and/or matrix multiplication right hand side values.

As another alternative or additional example, one of the compute vertex types may comprise a dynamic slice.

In yet further alternative or additional examples, the compute vertices may include different compute vertices representing at least three different kinds of convolution: forward pass, backward pass, and weight update pass.

The search may optionally comprise attempting to assign allocation functions to the sources of the different kinds of convolution vertex in the graph in an order comprising: first searching the graph to assign memory allocation functions to the sources of any instances of compute vertices representing a forward pass, then searching the graph to assign memory allocation functions to the sources of any instances of vertices representing the reverse pass, then searching the graph to assign memory allocation functions to the sources of any instances of vertices representing the weight update pass.

In embodiments, the search may start from bottom of graph and works back up.

In an example application of the disclosed method, said graph may comprise a neural network, and the program may comprise an algorithm configured to perform machine learning using the neural network.

According to another aspect disclosed herein, there is provided a software tool comprising software embodied on computer-readable storage and configured so as when run on a computer to perform a method according to any embodiment disclosed herein.

According to another aspect disclosed herein, there is provided a computer comprising storage comprising one or more memory units, and processing apparatus comprising one or more processing units; wherein the storage is arranged to store a software tool arranged to run on the processing apparatus, the software tool comprising software configured so as when run on said computer to perform a method according to any embodiment disclosed herein.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 1 is a schematic block diagram of a system comprising multiple tiles,

FIG. 2 is another schematic block diagram of a system comprising multiple tiles, FIG. 3 schematically illustrates a method for converting and compiling a graph, FIG. 4 schematically illustrates further detail of the method of FIG. 3, FIG. 5 schematically illustrates an example portion of a graph, FIG. 6 schematically illustrates another example portion of a graph, FIG. 7 schematically illustrates another example portion of a graph, FIG. 8 schematically illustrates another example portion of a graph, and FIG. 9 schematically illustrates an example of a 4D tensor.

DETAILED DESCRIPTION OF EMBODIMENTS

Figure 3:
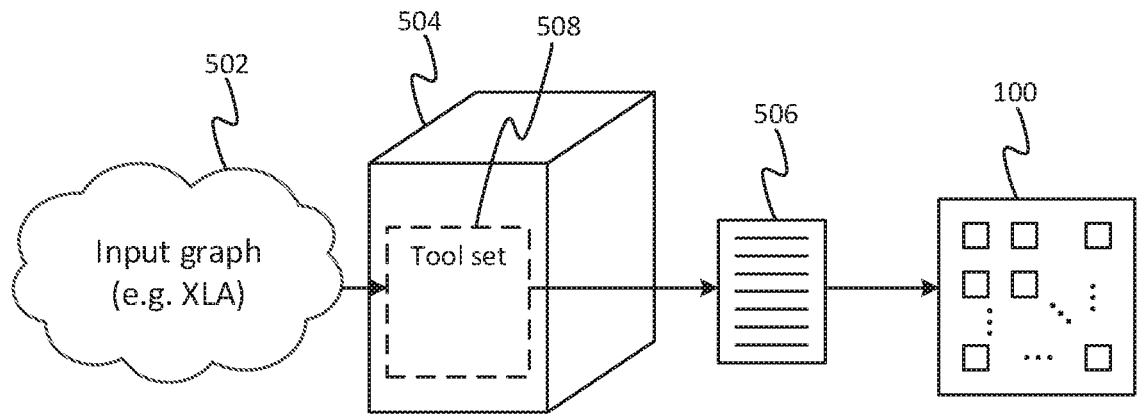

FIG. 1 shows an example system 100 upon which a compiled program may be executed in accordance with embodiments disclosed herein. The system comprises a plurality of tiles 4 implemented on one or more processor chips, with multiple tiles 4 on each chip (i.e. die). FIG. 2 illustrates an example where the tiles span two chips 2I, 2II, but it will be appreciated that this is just one example and the tiles could instead all be implemented on a single chip or spread across more than two chips. Each individual tile 4 comprises its own respective processing unit (each processing unit comprising its own respective execution pipeline for executing machine code instructions). Each individual tile 4 also comprises its own memory for storing data and code. Thus the system 100 supports a great deal of parallelism, enabling parallel execution of different respective parts of the overall program on different ones of the tiles 4. For instance, the (or each) chip 2 could comprise ≥10, ≥20, ≥50, ≥100, ≥200, ≥500 or even ≥1000 tiles. E.g. in one example there are 1280 tiles, or 1216 active tiles, per chip. Further, in embodiments each processing unit may take the form of a multi-threaded processing unit for interleaving multiple concurrent threads through the same pipeline. However this is not essential for the present purposes.

The system 100 also comprises an interconnect 6 comprising hardware logic enabling the different tiles 4 to communicate with one another, in order to exchange data, e.g. so the results of computations performed by one tile 4 can be sent to another. The interconnect 6 comprises at least an internal (on-chip) interconnect on the or each chip 2, for communicating between tiles 4 on the same chip. In embodiments where the tiles 4 span multiple chips 2, the interconnect 6 also comprises an external interconnect for communicating between tiles 4 on different chips 2.

As part of the compilation, different parts of the program are allocated to run on different ones of the tiles 4, and to exchange data with one another in order to operate together to implement the overall program as a whole. For instance the program may comprise a machine learning algorithm comprising a neural network, and different tiles 4 may run parts of the program representing different vertices of the neural network. In embodiments, the different parts of the program, when compiled, may be configured to synchronize with one another according to a suitable synchronization scheme such as bulk synchronous parallel (BSP), rendez vous, or the post box approach.

FIG. 3 illustrates an apparatus for compiling a program to run on a system 100 such as that described in relation to FIG. 1 and/or 2. The apparatus comprises a computer 504, which could take the form of a server comprising one or more server units at one or more geographical sites, or one or more user terminals such as a desktop computer, or a combination of a server and one or more user terminals. The computer 504 is arranged to run a tool set 508, taking the form of software stored on computer-readable storage of the computer 504 (e.g. one or more internal and/or external magnetic disk drives and/or EEPROMs) and arranged to run on one or more processors of the computer 504 (e.g. one or more CPUs). The tool set 508, when run on the computer 504, is arranged to receive an input graph 502, and to compile the input graph 502 in order to generate an executable program 506 which can then be run on a multi-tile processing system 100 such as that described in relation to FIG. 1 and/or 2.

Figure 5:
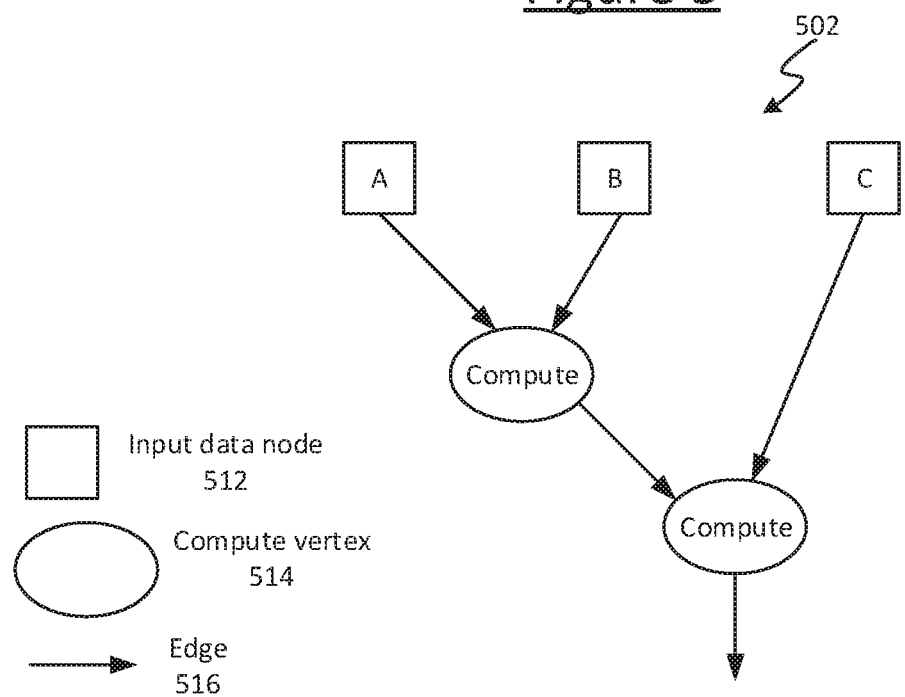

An example input graph (or portion of such a graph) 502 is illustrated in FIG. 5. The input graph 502 comprises a plurality of data nodes 512, a plurality of compute vertices 514, and a plurality of directional edges 516 each connecting from a data node 512 to a vertex 514 or between vertices 514. Each data node 512 in this representation represents a piece of source input data, i.e. a point at which a variable or constant is declared. In other words the graph 502 represents the inputs and constants (which are a form of unchanging inputs) as data nodes 512, but the data which is transferred between the compute vertices 514 are just represented as the connecting edges 516 in the graph. In accordance with exemplary applications of the techniques disclosed herein, at least some of the data nodes 512 and/or edges 516 each represent one or more tensors of order 1 or more (vector, matrix or higher order tensor), and the graph thus represents a tensor flow. Each edge 516 represents an output from a compute vertex 514 to a data node 512 or vice versa. Each compute vertex 514 (i.e. compute node) represents one or more computations to be performed on one or more inputs received on the edge(s) output from one or more data nodes 512, the result(s) of which is/are output to one or more data nodes 512 (typically one or more other data nodes) on the output edge(s) from the respective compute vertex 514. It will be appreciated that the particular graph topology shown in FIG. 5 (and FIGS. 6-8, discussed later) is just by way of example, and in practice the graph 502 will also tend to comprise many more nodes 512, edges 516 and vertices 514, in potentially more complex configurations. FIGS. 5-8 may be considered to show an example fragment of a graph for illustrative purposes.

The input graph 502 may be designed by a human developer to represent the data flows and computations the developer wishes to implement (the "developer" here could be one person or a team). For instance the graph 502 may comprise a tensor flow as part of a neural network. Note that in the case where the graph 502 represents a neural network, then each node of the neural network may comprise one or more compute vertices 514 and one or data nodes 512 of the graph 502 (i.e. of the graphical representation of the program). I.e. the graph of the neural network may be described at a higher level of abstraction than the graphical representation 502 of the program. The present disclosure is primarily concerned with the latter. Note also that while the input graph 502 is illustrated schematically as originating externally to the computer 504, which is one possibility, it could also originate from within the same computer 504 (e.g. having been authored and/or stored thereon using a suitable authoring tool, not shown).

Figure 4:
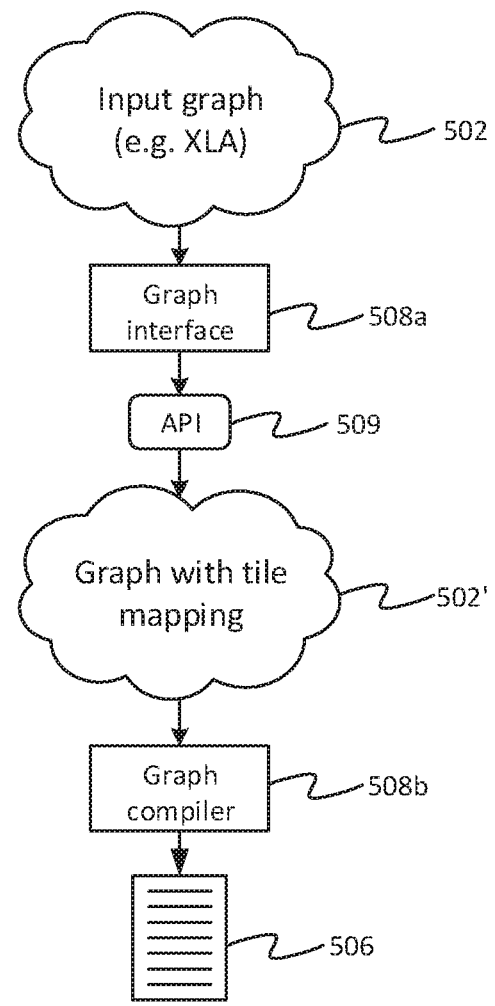

FIG. 4 illustrates an example of the tool set 508 and its operation. The tool set 508 comprises a graph interface 508*a*, and a graph compiler 508*b*. Each takes the form of a software tool stored and run on any part of the computer 504, which as mentioned, may comprise a single server unit or user terminal or a network of multiple server units and/or user terminals. By whatever means implemented, the graph interface 508*a* is configured to receive the input graph 502 in a first format. A format for representing a graph may also be referred to in the art as an intermediary representation, of an abstract syntax tree (AST). The first format is a format that does not include a tile-mapping. I.e. it is not tagged with an indication of which tile(s) 4 of the system 100 the data of each of the data nodes 512 are to be stored upon, nor which tile(s) the compute vertices 514 are to be run on in the final compiled version of the program. For example the first format may be HLO (High Level Optimizer), the graph format of XLA (Accelerated Linea Algebra), a graph format designed for use with TensorFlow. In issue therefore with such formats is that they assume the program is to be compiled for an ordinary CPU or GPU with no information about how to allocate amongst the memory of the different tiles 4 in a multi-tile architecture (a lot of small processor modules 4 connected together via a high sped bus 6). Without such information the compiler might naïvely compile the whole program to run on one tile 4.

To make efficient use of the multi-tile processor 2, this requires that the data nodes 512 and vertices 514 are allocated across different tiles 4, determining which nodes 513 and vertices 514 are to be stored and run on the memory of which tiles. To do this, the graph interface 508*a* is configured to receive the graph 502 in one intermediary representation and convert to another intermediary representation. More specifically, the graph interface 508*a* generates an application programming interface (API) 509 based on the input graph 502, which comprises a plurality of high-level functions for allocating data nodes 512 and computer vertices 514 amongst the tiles 4. To generate the API 509, the graph interface 508*a* systematically searches through the input graph 502 and allocates a memory allocation function to each of the nodes 502 and compute vertices 514.

For each data node 512 in the graph 502, the graph interface 508*a* automatically inserts in the API 509 a corresponding memory allocation function for determining upon the memory of which tile or tiles 4 the data of the node 512 is to be stored. E.g. such as function may take the form:

tensor_*t*=g.addvariable({ . . . });//add data node,e.g. a tensor

And for each compute vertex 514 in the graph 502, the graph interface 508 automatically inserts in the API 509 a corresponding vertex allocation function for determining which tile or tiles the vertex 514 is to be implemented upon. E.g. this function may take the form:

vertex_*v*=g.addvertex( . . . );//add compute vertex

From multiple such functions, the graph interface 508*a* can build up a description of a large graph in the API 509 (again FIG. 5 shows only a small fragment of an example graph for illustrative purposes). The functions may be implemented for example in a library of a high level language such as C++. The developer provides the input graph 502, and this is automatically translated into code (more correctly—calls to the API) by a framework convertor in the graph interface 508*a*.

After it is generated, the API 509 is then automatically called, which comprises calling the allocation functions. When called, each allocation functions adds its respective data node 512 or vertex 514 into a version of the graph 512 represented in a second format 512', and also determines which tile or tiles 4 that node or vertex 512, 514 is to be implemented on in the final program 506, and annotates the graph with this allocation. In the case of a data node 512 this comprises determining upon which tile or tiles' memory the data of that node 512 is to be stored. In the case of a compute vertex 514 this comprises determining which tile or tiles 4 to run the computations of that node 514 upon, and which tile or tiles' memory the code implementing those computations are to be stored.

The result is thus to output a graph 502' in a second format, which does include the tile-mapping, i.e. is tagged with the allocations of which nodes 512 and vertices 514 are to be implemented on while tiles 4, as determined by calling the memory and vertex allocation functions in the API 509.

The graph compiler 508*b* is arranged to then compile the converted graph 502' from second format into an executable program 506 consisting of low-level machine code instructions. As the target system 100 is a multi-tile system, the compiler 508 will need to generate the overall executable program 506 in the form of a plurality of respective constituent programs, one for each tile 4 that will be involved in the execution. The compiler 508*b* is configured to perform this division of the program between tiles 4 based on the tile mapping tagged onto the converted graph 502' in the second format. This will comprise both the allocation of the data represented by the data nodes 502 amongst the tile memories, and the allocation of the computations represented by the compute vertices 514 amongst the different tiles.

Note that the API 509 itself does not contain the tile mappings. Rather, it contains allocation functions which, when the API 509 is called, will generate the tile mappings. A memory allocation function such as g.addVariable( ) declares that there is data node 512 to add to the second-format graph 502'. A vertex allocation function such as g.addVertex( ) declares that there is compute vertex 514 to add to the second-format graph 502'. When these functions are called they add the relevant nodes 512 and vertices 514 to the second-format graph 502' and allocate the respective data and computations to tiles 4, tagging the graph 502' with this information.

In accordance with the present disclosure, the graph interface 508a in fact has available multiple different variants of the memory allocation function for data nodes 512. These different variants correspond to different types of compute vertex that may be encountered in the graph, representing different kinds of computation. I.e. depending on the type of computation, it may be desirable to allocate the source data feeding that computation to the tile memories in different ways. Examples of the different types of memory allocation functions for the data nodes 512 may include:

tensor_t=g.addVariable( );//generic function for adding variables tensor_t=g.addConvinputData( )//add convolution target data(subject data)

tensor_t=g.addConvWeights( );//add convolution weights tensor_t=g.addMatrixLHS( );//add matrix multiplication left-hand side tensor_t=g.addMatrixRHS( );//add matrix multiplication right-hand side Again these functions may be implemented for example in a library of a high level language such as C++. It will be appreciated also that these are not necessarily limiting and there may be various other types of computation that would benefit from having their data allocated amongst tile memories in bespoke ways. E.g. a dynamic slice operation is another example type of computation that may be provided with its own memory allocation function for its source data. A dynamic slice is an operation which has two inputs: the first is a large tensor, and the second is an index into that tensor. It returns a slice of data through the tensor at the input index.

Thus the disclosed method takes a graph 502 and lowers it by calling an API 509, where the API 509 has multiple ways of performing this lowering depending on the types of computation included in the graph.

Figure 6:
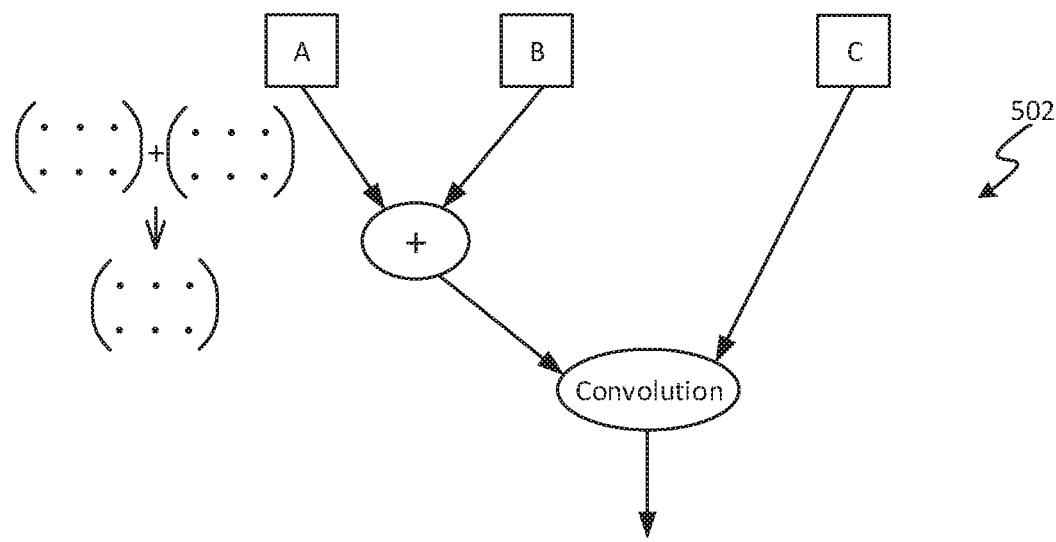

The principle of assigning the memory allocation functions to nodes 512 may be understood further with reference to the example of FIG. 6.

The graph interface 508a begins a search of the input graph 502 starting with a vertex 514 at the bottom of the graph. Bottom of the graph 512 means where one of the paths terminates, i.e. the last vertex 514 in a path along direction of the directional edges starting from the input node(s) 512 that is/are the source of that path. It doesn't matter which vertex 514 at the bottom of the graph 502 the search begins with. The search then traverses back up the path (or one of the paths) terminating with this bottom vertex 514. The search could be a breath first or depth first search. Either way, the search thus systematically passes over each compute vertex 514 in the graph 502. With each compute vertex 514 encountered, the search also then looks further back up the graph to identify which is/are the data node or nodes 512 that feed, i.e. which is/are the source of input data for the vertex 514 currently being analysed. "Feeding" or source here means directly or indirectly, i.e. the source node does not have to be a direct parent of the compute vertex 514 in question, but could be a predecessor one or more hops further back up the graph 512. So in the example of FIG. 6, data nodes A, B and C are the source data nodes of the convolution vertex (including parent C and grandparents A and B). Data nodes A and B are the source nodes feeding the addition vertex (+), in this case both being immediate parents.

For each compute vertex 514, the search attempts to match one of a predetermined set of compute vertex types to the current compute vertex 514. This set is the set of types of compute vertex for which there is provided at least one special type of memory allocation function for its respective source data. I.e. continuing the examples above, the predetermined set of compute vertex types may include convolution, matrix multiplication, and/or dynamic slice. If the vertex 514 currently being considered matches one of these predetermined types, then the graph interface 508a allocates the corresponding type of memory allocation function to its respective source data nodes 512, i.e. the upstream data nodes 512 that feed the vertex 514. So in the example of FIG. 6, nodes A, B and C would be assigned the memory allocation function for a convolution (g.addConvWeights in the above example). When the API 509 is called, this includes calling the assigned memory allocations functions for each of the nodes 502, thus causing the respective data to be allocated to the memories of the tiles 4 in accordance with the particular scheme of the assigned type of memory allocation function.

In embodiments there is a specific order to the matching: first searching the graph 502 once to attempt to find any instances of one type of compute vertex and assigning the corresponding type of memory allocation function for their source data nodes, then searching the graph 502 again to attempt to find any instance of one type of compute vertex and assigning the corresponding type of memory allocation function for that second type of vertex's source data nodes, and so forth. However the particular order is not necessarily essential. E.g. the relative order of matching the convolution, matrix multiplication and dynamic slice types makes no difference to the outcome of the graph. This is because the inputs are determined by the consumers; but latter nodes, whose inputs depend on the outputs of earlier nodes, cannot be allocated before their predecessors.

The specific memory allocation functions for the data of the different types of computation are designed to provide an efficient layout of the data amongst the tile memories given the manner in which that data is going to be processed by the respective type of computation. The library of functions thus provides different ways of mapping the data across the multiple tiles 4 depending on the type of computations the data feeds.

Figure 9:
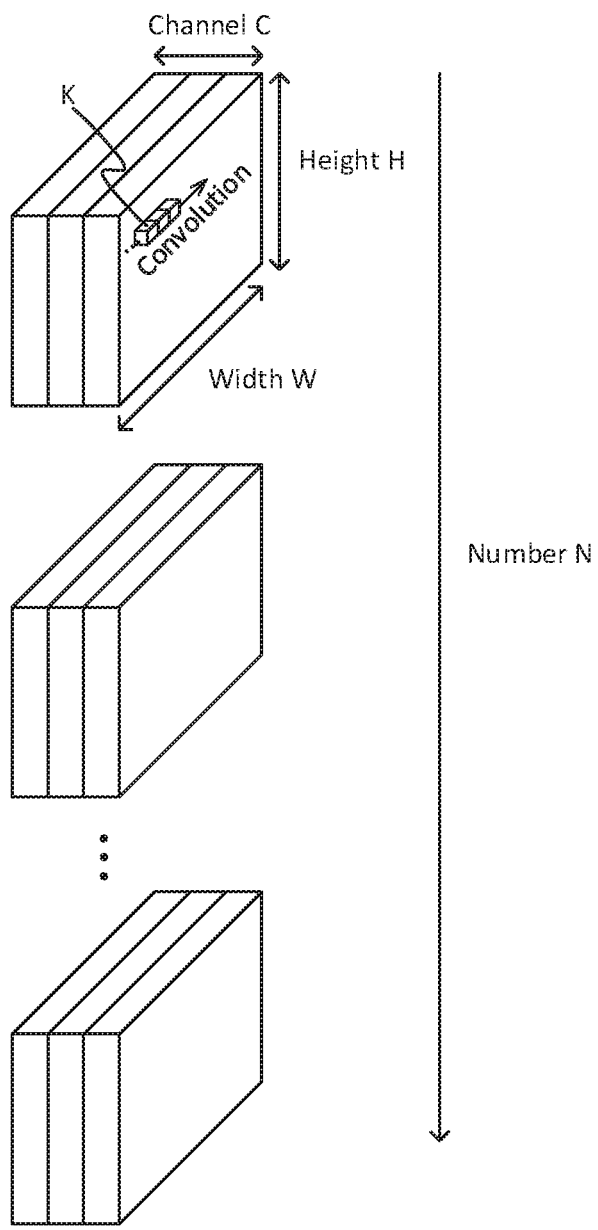

An example is illustrated schematically in FIG. 9. FIG. 9 shows an example of a convolution operation. A convolution comprises convolving a kernel of weights K with a portion of target data, in this case a multidimensional volume of data. "Target" data is given no more specific meaning herein that the data with which the kernel of weights is convolved in a convolution. In other words it is the subject data to which the kernel is applied. Also the term "kernel" as used herein could mean any tensor of weights applied as part of any convolution. It does not necessarily imply, e.g. graphics processing (though that is one possible application). Also a "multidimensional volume" is not limited to 3D volume of data. The input data (and the kernel) could be linear or 2D, or have a greater multi-dimensionality. "Multidimensional volume" is meant herein as a generic term for an n-dimensional volume in an n-dimensional feature space, where $n \geq 1$, e.g. an area if the data is two dimensional, a conventional volume if three dimensional, and a >3D hyper volume if the data is four or more dimensional. Similarly, tensor is a general term for vector, matrix or higher order tensor (sometimes the scope of the term tensor is considered to technically also include the trivial case of an order 0 tensor, i.e. a scalar, but for the present purposes a tensor means at least a vector).

In the example shown the target data is four dimensional, i.e. each data point in the data comprises a value for each of four variables. For example, this could comprise a batch of images. One dimension is the width W of each image, one dimension is the height H, another dimension is channel C, and another dimensions is the number of the image N within the batch. The channels may be e.g. red, green, blue (RGB); or chrominance and luminance (YUV). Or deep within a neural network there could be many more channels representing more abstract properties of the image such as "cat-like-ness" or "face-likeness", etc.

The convolution operation has to scan through the dimensions target data in some kind of systematic fashion, i.e. in an order, e.g. first scanning width W, then height H, then channel C, then number in the batch N. This order is sometimes referred to as NCHW, from most to least frequently scanned. The hierarchical order of dimensions from most frequently scanned to least frequently scanned is referred to in the art as an order from "major" to "minor" dimension. These could also be thought of as the most to least significant dimensions, by analogy with counting (where the most significant digit refers to the least frequency cycled digit and the least significant digit refers to the most frequently cycles digit). The most major dimension is the least frequently scanned (most significant) dimension and the most minor dimension is the most frequently scanned (least significant) dimension. In the case of more than two dimensions, there are degrees of this from major to minor.

So in the example given, this means the convolution scans the kernel across the image once in the W direction (say starting at the top or bottom of the image), then after that once scan or pass across the image, it increments by one step in the H direction and performs another scan or pass in the W direction. After scanning once whole image plane in this manner, it then steps back or forward by one channel C and scans the W×H plane again. After scanning the whole image in this way, it then increments N by one step and performs a whole W×H×C scan again, and so forth. So W is the most minor dimension, H is the second most minor dimension (or third most major dimensions), C is the second most major dimension (or third most minor dimension), and N is the most major dimension. Of course this is only once example. In other implementations the convolution could scan in the order NHWC, or CHWN, or CNHW, etc. Also, the example of a batch of images is just once example application, and everything described could apply equally to the dimensions of any multidimensional volume of data with any number of dimensions from major to minor.

Taking the NCHW case as an example (scan by W, then H, then C, then N); the convolution will find itself accessing different values in the W direction most often, then different values in the H direction second most often, then different values in the C dimension, then least often different values in the N dimension.

To provide for efficient memory access and to reduce communication between tiles 4, it would therefore be desirable to place "slabs" or "slices" of the most frequently scanned dimension(s) in the same place. So it in the example, it would be desirable to place a given line in the W dimension or plane (e.g. images) in the W×H plane on the same tile 4. Thus in embodiments the memory allocation function for the target data of the convolution vertex type is configured to split the target data, or the source data from which the target data is derived, across tiles 4 in this manner. Again "slice" herein is meant in a generic n-dimensional sense where $n \geq 1$. The size and dimensionality of the slice that can be allocated to each tile 4 may depend on the memory available per tile.

E.g. one plane may be stored on one tile 4, another W×H plane may be stored on another tile 4, and so forth. If more memory is available per tile 4, then a different respective slab of two or more W×H planes could be stored per idle. If less memory is available per tile 4, then only a respective line or only a respective subset of lines in the W direction may be stored per tile 4 (e.g. say half a W×H plane per tile 4, splitting halfway down the H direction, that being the second least significant dimension). This kind of operation is sometimes referred to as "flattening" the data.

Note that the target data and kernel K could be data of the source data nodes 512, or could be derived from them vicariously via one or more intermediate compute vertices in the path between the source nodes 512 and the convolution vertex. E.g. in the example of FIG. 6, the input node C may represent the kernel K; but the output of the addition vertex (+) may give the target date. In this case the target data may be said to be derived from two source nodes 512, namely A and B. So in this case, the memory allocation function for the convolution may attempt to distribute each of A and B in the manner described. Note also that the volume of target data may be expressed either as one large tensor or a set of multiple constituent tensors, and similarly for the kernel. So e.g. each node A could be expressed as a single tensor of the size of the whole target data, or multiple tensors making up that size. A given input node 512 could represent one or more tensors.

Note also that for some types of compute vertex, that type of compute vertex can have more than one type of memory allocation function associated with it corresponding to different ones of its inputs. For instance the convolution vertex type may be provided with one function g.addConvWeights( ) for adding and allocating the weights of the kernel K, and g.addConvinputData( ) for adding and allocating the target data with which the kernel K is to be convolved.

The allocation functions for matrix multiplication left and right hand sides, g.addMatrixLHS( ) and g.addMatrixRHS( ), may be similar to those for the convolution, but they divide up the data appropriately for a matrix multiplication. For instance, in embodiments they may work by analysing the shape of the matrix multiplication, and then deciding how to use the compute resources (e.g. different types of machine code instruction in the instruction set such as accumulating matrix product instructions or vector instructions) to perform the matrix multiplication in the fastest way. In some embodiments, the matrix multiplication may be a wrapper around convolution, so the layout may be determined in a similar manner as the convolution based on the input data shape.

As mentioned, dynamic slice is an operation which has two inputs. The first is a large tensor, and the second is an index into that tensor. It returns a slice of data though the input tensor from a location defined by the input index. Embodiments may use a special allocator for this because it is preferable to slice as much of the data as possible in parallel. I.e. so the 'major' dimensions should be the ones which are sliced, and they should be grouped according to the known number of parallel tiles operating on the slice.

The exact preferred way of dividing up a tensor amongst the tiles 4 may be architecture dependent, e.g. depending on the instruction set, word width and/or memory architecture of the tiles 4. For a particular target hardware architecture and a given type of computation, the skilled person will be able to design a desired memory allocation for dividing a tensor between tiles. What the present invention provides is a mechanism for traversing the graph and selecting between different memory allocation functions depending on the type of compute node.

For some vertices that are not included in the set and have no dedicated memory allocation function for their source data, the graph interface 508a may fall back on assigning a generic memory allocation. E.g. this is the g.addVariable( ) function in the example list given previously. The generic memory allocation function simply attempts to spread the data evenly accords the memory of a group of some or all of the tiles, without any knowledge of the dimensionality of the data or how the compute vertex in question will process it. The generic memory allocation function is preferably last in the matching order.

In embodiments, the graph interface also does not assign the corresponding dedicated type of memory allocation for the sources of all instances of the corresponding type of compute vertex that are encountered in the search. I.e. even when a vertex 514 is matched to one of the predetermined set of special compute vertex types, the corresponding memory allocation function(s) is/are still not necessarily assigned for all of its source node(s) 512. This is illustrated by way of example in FIGS. 7 and 8.

This occurs when two conditions arise. The first is that at least one of the inputs to the matched compute vertex 514 is not an input data nodes 512 directly, but rather the output of another, predecessor compute vertex 514 in the path between the source data node 512 and the matched vertex 514. I.e. there are one or more intermediate predecessor compute vertices 514 in the path between the source data node 512 and the compute vertex 514. The second condition is that one of these intermediate predecessor compute vertices in the path changes the shape of the date in between the source data node 512 and the matched compute vertex 514. Changes the shape here means distorts the dimensionality of the data. So for example a concatenation of two tensors would result in a larger size of tensor in at least one dimension, or a rotation of a tensor would result in one dimension becoming larger and the other smaller.

If both these first and second conditions arise, then in embodiments the graph interface 508a does not assign the dedicated corresponding type of memory allocation to the source node or nodes 512 of the matched vertex 514, or at least not all of them. Instead, it falls back on assigning the generic type of memory allocation function to at least that/those source node(s) 512 whose shape is distorted by the intermediate vertices(s). Thus the predecessor(s) may affect the outcome of the decision. This is done on the basis that, in some embodiments, the memory allocation function for the matched compute vertex type may not be configured to accommodate the distortion of the dimensionality between the source node(s) 512 and the data presented at the matched vertex's inputs. I.e. the allocator function is expected inputs of a certain predetermined size in each dimension, and may not be able to accommodate differently sized data in any of these dimensions. The generic function attempts to spread the data out evenly over the tile 4, but does not give the benefit of understanding the dimensionality of the data.

Refer first to FIG. 6. Here it is possible to assignee the dedicated convolution data and weights memory allocation functions addConvinputData( ) and addConvWeights( ) to both the sources A & B of the input data and the source C of the weights. When the search matches the convolution vertex type to the convolution vertex, it traces each input path back up the graph. In going so it finds an addition vertex (+) between the sources A & B of the target data and the target data as presented at the input of the matched convolution vertex. However, since a tensor addition simply adds each element in one tensor to its counterpart element in the other tensor, then it does not change the shape of the resulting tensor compared to the input tensors in anyway. E.g. if the inputs are both L×M matrices, the result is an L×M matrix as well. Hence the graph interface 508a does assign the special addConvinputData( ) to the sources A and B of the target data. Also it does assign addConvWeights( ) to the weights input C since there is no intermediate operation on that path (C inputs directly to the convolution weights input).

Figure 7:
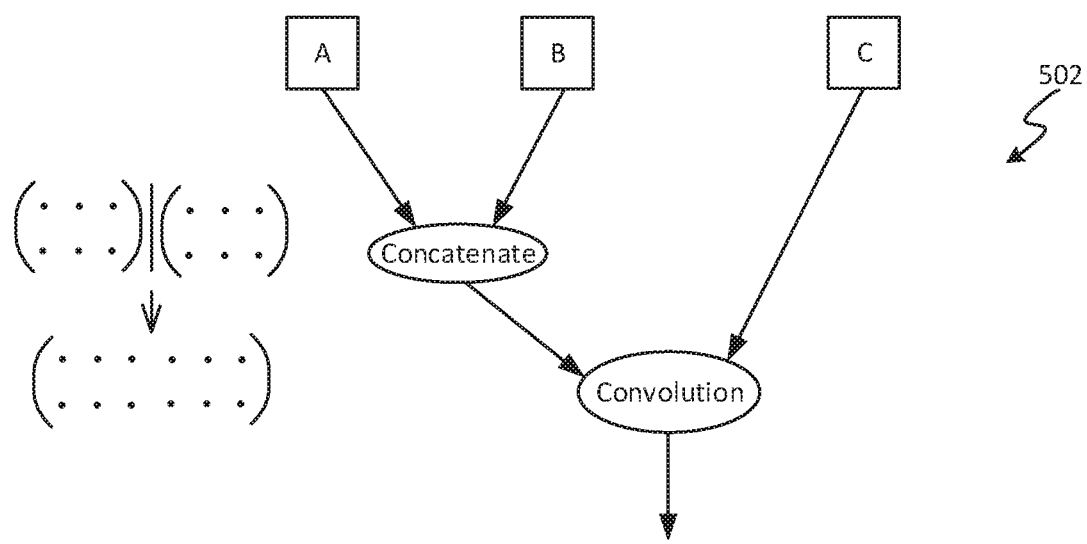

Refer now to FIG. 7 by way of contrast. Here when the search traces the path back between the matched convolution vertex and its source nodes A &B, it finds a tensor concatenation operation between the sources A & B and the matched vertex. This increases the size of the E.g. say the sources A & B are both L×M matrices respectively, then the concatenation will be a 2L×M matrix or L×2M matrix (depending on whether a horizontal or vertical concatenation). Hence the graph interface 508a does not assign the special addConvinputData( ) to the sources A and B of the target data, but instead assigns the generic memory allocation function g.addVariable( ) to each of these. It may still assign addConvWeights( ) to the weights input C.

Figure 8:
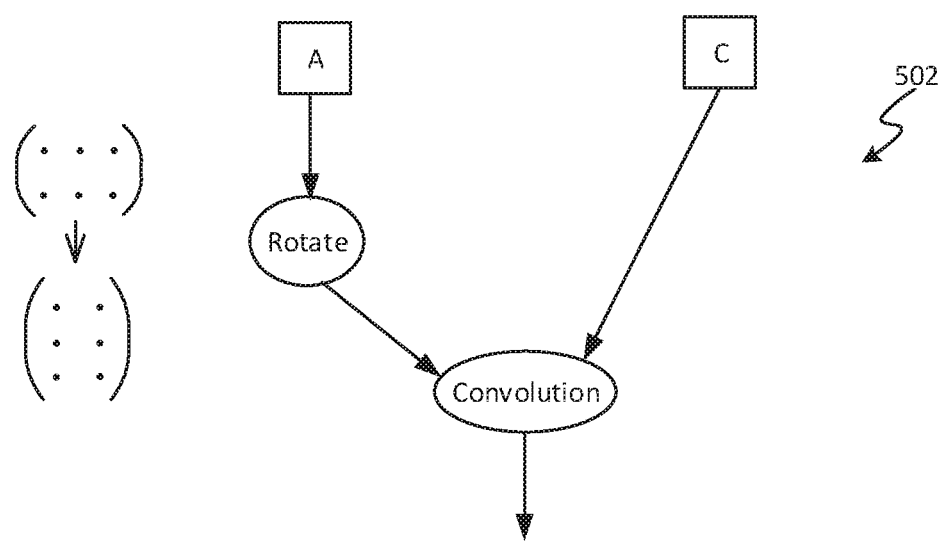

Another example is shown in FIG. 8. Here when the search traces the path back between the matched convolution vertex and a single source node A, it finds a tensor rotation operation between the sources A & B and the matched vertex, e.g. a dim shuffle operation. This again changes the shape, assuming the tensor is not even-sided in the plane of the rotation (e.g. a square matrix). So for example if the source A is a L×M matrix, the result is a M×L matrix. Hence the graph interface 508a does not assign the special addConvinputData( ) to the source A, but instead assigns it the generic memory allocation function g.addVariable( ). Again it may still assign addConvWeights( ) to the weights input C.

Note however, in some embodiments, it is not essential to fall-back on the generic allocation function for all possible vertices that have shape changing predecessors. In some embodiments it is possible to go back up past a shape changing vertex, for some or all shape changing vertices. To achieve this, the graph interface 508a comprises a stored list of shape changing vertices that may occur between the producer and consumer. It performs the allocation using the allocator for the consumer (descendant), and then reverse applies the shape changing operations to get back to the input. The list of shape changing vertices may comprise all possible shape changing vertices in the graph, or only a certain subset for which a reverse operation is available. In the latter case, the fall-back on the generic function is still used for vertices with shape-changing predecessors not on the list.

In some embodiments, the input graph 502 may include different kinds of convolution vertex. These may comprise: forward pass, backward pass, weight update pass (Tensor-Flow calls them forward, back propagation gradient, and back propagation filter, respectively). Preferably, the search attempts to match the different kinds of convolution in this order. I.e. first it searches the graph for any forward pass vertices and assigns the convolution type of memory allocation function for their source data nodes, then it searches the graph 502 for any reverse pass vertices and assigns a memory allocation function for their source data nodes, and then it searches the graph 502 for any weight update pass vertices and assigns a memory allocation function for their source data nodes. The reason for this is that the library's convolution vertices may be written with the assumption that the weights and input data are laid out according to the requirements of the forward pass convolution. It would be detrimental to lay them out in another format. However, the order is not essential: process works whichever order is used, but not using the preferred order may result in a larger and/or slower output graph 502'.

In embodiments only the forward pass vertex type has its own dedicated corresponding type of memory allocation function, whilst sources of the reverse pass and weight upstate vertices are allocated using the generic function. However, in alternative embodiments the set of special predetermined vertex types could e.g. include two or all of the three different kinds of convolution vertex, and there could be different functions provided for allocating the source data of these different kinds of convolution.

It will be appreciated that the above embodiments have been described by way of example only. For instance, the applicability of the disclosed techniques is not limited to neural networks or machine intelligence applications, and can more general be of use in any program that can be modelled as a graph for execution across multiple tiles. There are many other applications where it may be desired to perform processes such as those comprising vector multiplications, matrix multiplications and/or convolutions, etc., where the program may be modelled as a graph of data nodes, edges and compute vertices. Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method for generating an executable program to run on a system of one or more processor chips each comprising a plurality of tiles, each tile comprising its own processing unit and memory, the method comprising:
   receiving a graph comprising a plurality of data nodes, a plurality of compute vertices and a plurality of directional edges, each data node representing input data, each edge representing an input to a compute vertex from a data node or an output from a compute vertex input to another compute vertex, and each compute vertex representing one or more computations to perform on the input to the compute vertex in order to produce the output from that compute vertex, wherein the graph is received in a first graph format that does not specify which data nodes and vertices are allocated to which of the tiles;
   generating an application programming interface, API, for converting the graph from the first format including to determine a tile-mapping allocating the data nodes and vertices amongst the tiles;
   calling the API to convert the graph to a second graph format that includes the tile-mapping; and
   compiling the graph from the second format to generate said executable program, with the vertices and data nodes implemented on the tiles specified by the tile-mapping.

2. The method of claim 1, wherein a first one of the data nodes represents input data comprising a tensor having two dimensions.

3. The method of claim 2, wherein the tensor has at least three dimensions.

4. The method of claim 2, wherein the tensor has more than three dimensions.

5. The method of claim 1, wherein:
   the computation represented by a first one of the compute vertices comprises a convolution configured to convolve a kernel of weights with a multidimensional portion of target data, the weights and target data each being comprised by the input data of a first one of the data nodes, or derived from the first one the data nodes via an intermediate compute vertex between the input data and the compute vertex.

6. The method of claim 5, wherein the compute vertex type has another corresponding type of memory allocation to add the weights.

7. The method of claim 1, wherein:
   a first one of the compute vertices represents a computation comprising a matrix multiplication which multiplies a left-hand side with a right-hand side, each being a tensor and at least one of which is a matrix, the matrix multiplication left-hand side and right-hand side each being comprised by the input data of a first one of the data nodes, or derived therefrom via one or more intermediate compute vertices between the input data and the compute vertex.

8. The method of claim 1, wherein the plurality of compute vertices includes at least three different kinds of convolution: forward pass, backward pass, and weight update pass.

9. The method of claim 1, wherein said graph comprises a neural network, and the program comprises an algorithm configured to perform machine learning using the neural network.

10. A software tool comprising software embodied on computer-readable storage and configured so as when run on a computer to perform a method comprising:
   compiling a graph into an executable program having machine code instructions, wherein the graph has a plurality of data nodes, a plurality of compute vertices and a plurality of directional edges, and wherein the graph is compiled for a system having a processor chip with a plurality of tiles each having a processing unit and a memory, and wherein the graph is in a first graph format that does not allocate the data nodes and the vertices to the tiles;
   wherein the machine executable code for compiling the graph causes the computer to:
   generating an application programming interface (API) determining a tile-mapping that allocates the data nodes and vertices to the tiles; and
   calling the API to convert the graph to a second graph format that includes the tile-mapping.

11. A computer storing a software tool, the software tool comprising software configured so as when run on said computer to perform a method comprising:
- compiling a graph into an executable program having machine code instructions, wherein the graph has a plurality of data nodes, a plurality of compute vertices and a plurality of directional edges, and wherein the graph is compiled for a system having a processor chip with a plurality of tiles each having a processing unit and a memory, and wherein the graph is in a first graph format that does not allocate the data nodes and the vertices to the tiles;
- wherein the machine executable code for compiling the graph causes the computer to:
- generating an application programming interface (API) determining a tile-mapping that allocates the data nodes and vertices to the tiles; and
- calling the API to convert the graph to a second graph format that includes the tile-mapping.

* * * * *